UNITED STATES PATENT OFFICE.

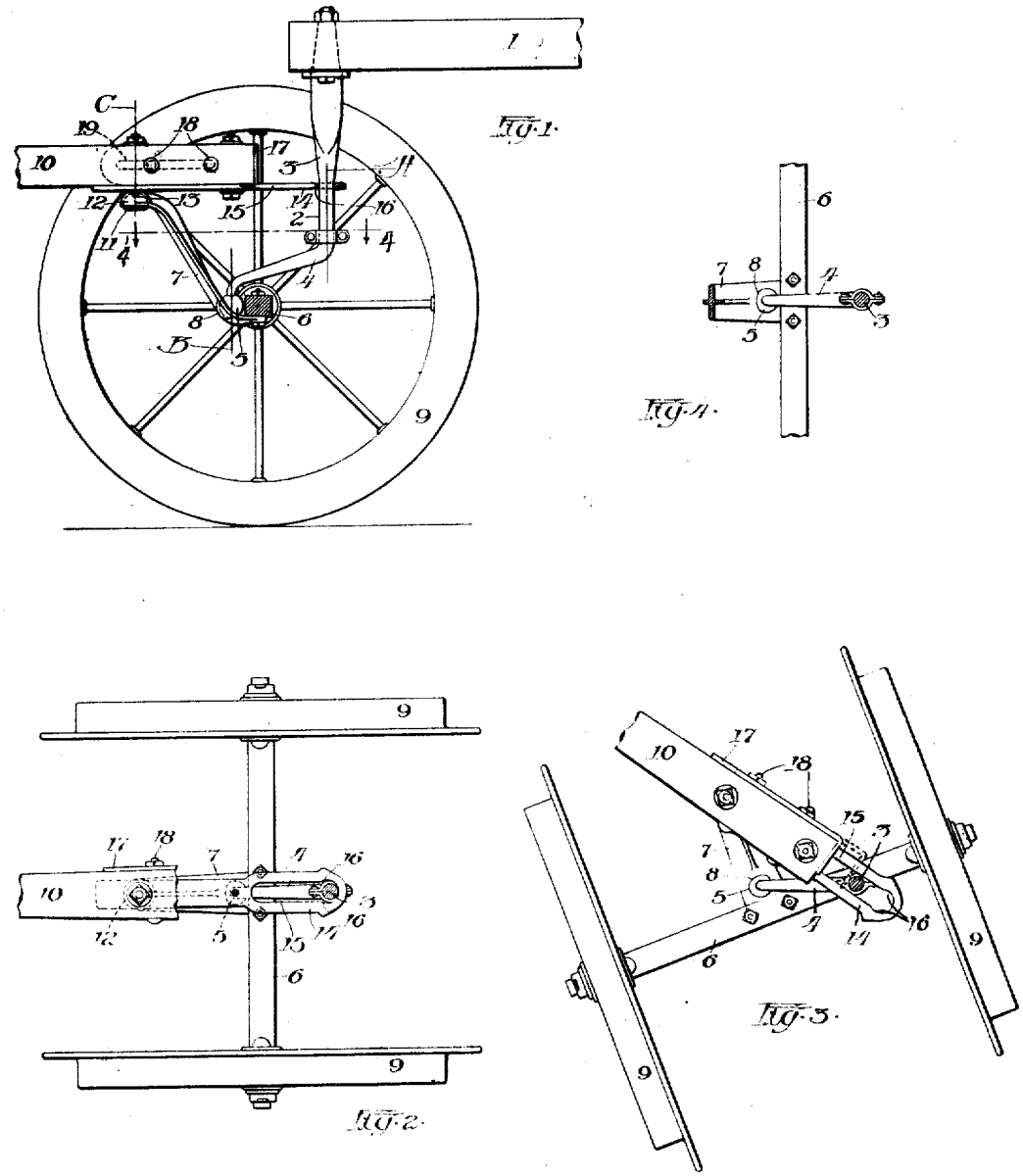

CHARLES A. A. RAND, OF CHICAGO, ILLINOIS.

TONGUE-TRUCK.

No. 921,161.　　　Specification of Letters Patent.　　　Patented May 11, 1909.

Application filed November 8, 1907. Serial No. 401,217.

*To all whom it may concern:*

Be it known that I, CHARLES A. A. RAND, a citizen of the United States, residing at Chicago, in the county of Cook and State of Illinois, have invented a new and useful Improvement in Tongue-Trucks, of which the following is a complete specification.

This invention relates to tongue trucks for harvesters, cultivators, harrows and other similar agricultural implements requiring a supporting and steering truck and is concerned more particularly with the novel arrangement, whereby the truck axle, in turning, is deflected faster than the tongue.

The object in view is to provide a truck simple in construction, effective in its operation, one in which the single axle is retained and a trailing effect of the wheels is secured.

Referring to the accompanying drawings—Figure 1 represents a side elevation and partial section of a tongue truck embodying my invention. Fig. 2 is a plan view of same with the stub tongue and a portion of the pole tongue removed, the parts being shown in their normal working position. Fig. 3 represents a similar plan view but with the truck axle and pole tongue in positions they occupy when turning; and Fig. 4 is a fragmentary detail plan section, taken as indicated by the line 4—4 in Fig. 1, and is designed to show the flexible, pivotal bearing of the support on the forward end of the stub tongue with the truck axle.

In the several figures and throughout the specification, like numerals refer to like parts.

The stub tongue (only a portion thereof being shown), which the truck supports, is designated by the numeral 1, and it is to be understood that this may be either the stub tongue of an ordinary harvester, the frame member of a stripper harvester, or frame member of the implement to which the truck is applied. To the underside of the forward end of the stub tongue 1 is rigidly secured a downwardly projecting standard 2, consisting of the vertically extending portion 3 and the forwardly extending portion 4, the latter portion terminating at its forward end in the ball 5. The standard 2 in effect constitutes a portion of the stub tongue 1 and is so regarded in the appended claims. The pole tongue is flexibly and pivotally supported upon the axle 6 by means of a forwardly and upwardly projecting arm 7, rigidly fixed to said axle, and in this arm is formed a socket 8 laterally disposed with respect to the axle for the reception of the ball 5 on the lower end of the standard 2. The socket 8 is formed in the arm 7 a slight distance in advance of the longitudinal axis of the axle 6, so that a trailing effect is given to said axle and supporting wheels 9 journaled on the ends thereof. This arm 7 may be regarded as a forwardly projecting arm, or an arm which projects laterally with respect to the longitudinal axis of the axle.

On the forward end of the arm 7 is flexibly pivoted the pole tongue 10, only a portion thereof being shown, while the rear end of said pole tongue is fulcrumed on the standard 2 of the stub tongue. The joint, or articulation, between the pole tongue 10 and arm 7 is effected by means of the ball-headed bolt 11, which is received by a socket 12 on the forward end of said arm. A slot 13 in the socket 12 permits of tipping movement laterally between these parts and permits also of a pivotal movement of the pole tongue on the arm 7. Likewise the ball 5 on the standard 2, bearing in the socket 8, will permit of movement not only about a vertical, pivotal axis, but in other directions as well; hence there is provided a flexible, pivotal bearing between the axle and stub tongue, and also between the axle arm and pole tongue.

To the under side of the rear end of the pole tongue 10 is bolted a plate 14, which is provided, at its rear end, with a longitudinally extending slot 15. This slot engages the vertical portion 3 of the standard 2, the standard thus forming the fulcrum for the pole tongue 10, and as said tongue is deflected laterally it will turn the axle 6 about its pivotal bearing with the stub tongue. The rear end of the slot 15 terminates in two lateral, shallow extensions 16, thus rendering the slot, at this point, considerably larger than the stem of the standard 3 passing therethrough, and hence permitting of slight vertical deflections of the axle 6 without causing corresponding deflections of the pole tongue or twisting the stub tongue. The plate 14 thus forms a pivotal bearing with the standard 2 of the stub tongue, and the pivotal point is constantly varying as the tongue is deflected by the tongue sliding rearwardly as well as turning, as clearly shown in Fig. 3.

For brevity, the pivotal bearing between the pole tongue 10 and standard 2 of the stub tongue, will be designated by A, the pivotal bearing between the truck axle and standard of the stub tongue formed by the ball 5 on the lower end of said standard and the socket 8 will be designated by B, and the bearing between the pole tongue and arm 7 of the axle by C. As the lever arm formed by the rear end of the pole tongue between the pivotal bearings A and C is greater than the distance between the pivotal bearings B and C, it follows that the truck axle 6 will have a greater angular deflection in turning of the tongue than will the tongue itself. The bearing B between the stub tongue and truck axle is placed slightly forward of said axle, thus securing a trailing effect of the truck and rendering it easier to guide. This bearing point B, however, should lie comparatively near the longitudinal axis of the axle 6 to prevent skidding of the wheels as much as possible when turning. To procure the best results the bearing B should lie nearer the axle than does the pivotal bearing C between the axle arm and the pole tongue.

In turning the truck axle from the position shown in Fig. 2 to that shown in Fig. 3, the stem 3 of the standard 2 is made to approach the forward end of the slot 15 in said plate, and it is evident that on reaching the forward end of the slot further movement of the axle will be arrested. The extent of such movement forwardly of the stem in the slot is determined by means of the adjustable stop 17, which is secured to the rear end of the pole tongue by means of the bolts 18, the slot 19 in said stop permitting of such adjustment. The function of this stop is to limit the extent of the angular deflection of the truck axle, such limit being at a point where the longitudinal axis of the axle would if extended, intersect a vertical line passing through the contact point with the ground of the main supporting wheel of the harvester. When this stop contacts with the stem 3 the pole tongue 10 will be held in that position rigidly, and the axle 6, in further turning the machine, will thus point direct to the pivotal point on which the entire machine turns, which is the correct angle for the truck axle, as is well understood. In Fig. 3 the stop 17 is shown in full lines in the forward limit of its movement, and in dotted lines is shown in a position which will arrest further turning of the pole tongue or axle and cause the turning action to take place with the axle at this angle.

It will be seen that in deflecting the pole tongue, either the lever arm between the bearings A and B or the lever arm between the bearings B and C, or that between A and C, must vary in length. The construction shown provides for varying the length of the lever arm formed on the rear end of the pole tongue between the bearings A and C, such means consisting in the slotted plate 14.

It is evident that instead of having the sliding, pivotal connection at the bearing A, a sliding bearing could equally as well be provided for either at B or C; and it is also obvious that instead of a slotted connection, as shown, links, sectors or gears, external or internal, or other equivalent devices might be employed, which would compensate for the change in length in one of the arms.

What I claim as my invention, and desire to secure by Letters Patent, is:

1. In combination with the stub tongue of a harvester or like machine, a truck axle having a pivotal connection with the forward end of the stub tongue, an arm projecting laterally with respect to the longitudinal axis of said axle, a pole tongue pivotally connecting with the stub tongue and projecting forwardly therefrom, said pole tongue also pivotally connecting with said laterally projecting arm on the axle, one of said pivotal connections permitting of a variation of the distance between it and the other pivotal connections when the pole tongue is deflected horizontally.

2. In combination with the stub tongue of a harvester or like machine, a truck axle having a pivotal connection with the forward end of the stub tongue, an arm projecting laterally with respect to the longitudinal axis of said axle, a pole tongue pivotally connecting with the stub tongue and projecting forwardly therefrom, said pole tongue also pivotally connecting with said laterally projecting arm on the axle, that portion of the pole tongue which lies between its pivotal connection with said laterally projecting arm and said stub tongue being of a greater length than the distance between the connection with the laterally projecting arm and the vertical plane passing through the longitudinal axis of said truck axle, one of said pivotal connections permitting of a variation of the distance between it and the other pivotal connection when the pole tongue is deflected horizontally.

3. In combination with the stub tongue of a harvester or like machine, a tongue truck comprising an axle upon which said stub tongue is flexibly supported, wheels journaled on the ends of the axle, and a pole tongue fulcrumed on the stub tongue and provided with a flexible connection with the axle, the said connection with the axle being at a point farther from the longitudinal axis thereof than is the flexible bearing between said axle and the stub tongue.

4. In combination with the stub tongue of a harvester or like machine, a tongue truck comprising an axle, wheels journaled on the ends thereof, a forwardly projecting arm secured rigidly to the axle, the said stub tongue having a flexible pivotal bearing on said arm slightly forward of said axle, and a pole tongue having a flexible pivotal bearing on the forward end of said arm and a horizontally sliding connection with said stub tongue.

5. In combination, a stub tongue of a harvester or like machine, a downwardly projecting standard fixed to the forward end thereof, an axle, supporting wheels journaled on the ends thereof, a forwardly projecting arm secured rigidly to said axle and articulating at a point slightly forward of said axle with the lower end of the standard, and a pole tongue having a flexible pivotal connection with the forward end of said arm and a sliding pivotal connection with said standard.

6. In combination with the stub tongue of a harvester or like machine, a tongue truck comprising an axle upon which said stub tongue has a pivotal bearing, wheels journaled on the ends of said axle, a pole tongue fulcrumed on the stub tongue and provided with a pivotal connection with said axle, and an adjustable stop to limit the extent of angular deflection of the pole tongue relative to the stub tongue.

7. In combination with the stub tongue of a harvester or like machine, a tongue truck comprising an axle upon which said stub tongue has a pivotal bearing, wheels journaled on the ends of said axle, a pole tongue having a flexible connection with said axle and a sliding pivotal connection with said stub tongue, and an adjustable stop fixed on the pole tongue for limiting the sliding movement between the pole and stub tongues.

8. In combination, a stub tongue of a harvester or like machine, a downwardly projecting standard fixed to the forward end thereof and consisting of a vertically and a forwardly extending portion, an axle having supporting wheels journaled on the ends thereof, a forwardly projecting arm secured rigidly to said axle and articulating with the end of the forwardly projecting portion of said standard, a pole tongue, and a longitudinally slotted plate secured rigidly to the rear end thereof, the said pole tongue having a flexible pivotal bearing with the forward end of said arm and a sliding pivotal bearing with the vertical portion of said standard.

9. In combination, a stub tongue of a harvester or like machine, a downwardly projecting standard fixed to the forward end thereof and consisting of a vertically and a forwardly extending portion, an axle having supporting wheels journaled on the ends thereof, a forwardly projecting arm secured rigidly to said axle and articulating with the end of the forwardly projecting portion of said standard, a pole tongue having a flexible pivotal bearing with the forward end of said arm and a longitudinally slotted plate fixed to and projecting rearward from said pole tongue and engaging with the slot thereof the vertical portion of said standard, the slot in said plate terminating at its rear end in shallow, lateral extensions, which permit of a slight angular movement of the truck axle without a corresponding movement of the pole tongue.

10. In combination with the stub tongue of a harvester or like machine, a tongue truck comprising an axle upon which said stub tongue has a pivotal bearing, wheels journaled on the ends of said axle, a pole tongue fulcrumed on the stub tongue and provided with a pivotal connection with said axle, and a stop for limiting the extent of angular deflection of the pole tongue relative to the stub tongue.

CHARLES A. A. RAND.

Witnesses:
J. C. WARNES,
F. W. HOFFMEISTER.